(12) United States Patent
Choi

(10) Patent No.: US 6,684,264 B1
(45) Date of Patent: Jan. 27, 2004

(54) METHOD OF SIMPLIFYING MACHINE OPERATION

(75) Inventor: Christopher Wai-Ming Choi, Richmond Hill (CA)

(73) Assignee: Husky Injection Molding Systems, Ltd. (CA)

( * ) Notice: Subject to any disclaimer, the term of this patent is extended or adjusted under 35 U.S.C. 154(b) by 490 days.

(21) Appl. No.: 09/596,077

(22) Filed: Jun. 16, 2000

(51) Int. Cl.[7] .................................................. G06F 3/00
(52) U.S. Cl. ........................... 710/15; 710/43; 700/201; 700/204
(58) Field of Search ........................... 710/1, 15, 8, 12, 710/14, 17, 19, 29, 31, 36, 38–40, 18, 43, 72, 105; 700/200, 197, 204

(56) References Cited

U.S. PATENT DOCUMENTS

| | | | | | |
|---|---|---|---|---|---|
| 5,302,103 | A | * | 4/1994 | Brown et al. ................ | 425/150 |
| 5,736,080 | A | * | 4/1998 | Suganuma .................. | 264/40.3 |
| 5,852,722 | A | * | 12/1998 | Hamilton .................... | 709/221 |
| 6,137,408 | A | * | 10/2000 | Okada ........................ | 340/556 |
| 6,275,741 | B1 | * | 8/2001 | Choi ........................... | 700/200 |
| 6,393,807 | B2 | * | 5/2002 | Tipton et al. ................ | 53/504 |
| 6,466,154 | B1 | * | 10/2002 | Kim et al. .................. | 341/176 |

FOREIGN PATENT DOCUMENTS

EP 0 671 678 A1 10/2000 ......... G05B/19/409

\* cited by examiner

*Primary Examiner*—Kim Huynh
*Assistant Examiner*—Rijue Mai
(74) *Attorney, Agent, or Firm*—Katten Muchin Zavis Rosenman

(57) ABSTRACT

Apparatus and method for controlling a molding machine includes structure and function for a human machine interface control panel having: (i) a flat panel display screen; (ii) a pointing device; (iii) a plurality of pushbuttons overlaid with or without icons; (iv) a housing containing the above and the associated electronics; (v) structure to uniquely identify each users preferred configuration; (vi) structure to connect to a remote controller for both digital information and video signal communication; (vii) a connection for receiving external power to drive the panel's electronics and display; and (viii) software running in the remote controller to provide all the operating functions of the human machine interface.

26 Claims, 13 Drawing Sheets

METHOD OF SIMPLIFYING MACHINE OPERATION

BACKGROUND OF THE INVENTION

1. Field of the Invention

The present invention relates to apparatus and method for controlling a molding machine, and in particular to a human machine interface in the form of a control panel for a machine controller, which controls and monitors the operation and processes of a molding system (such as an injection molding machine for plastic or metal) and its associated equipment (such as a robot or other product handling equipment). The invention also relates to a human machine interface, which provides means to simplify and customize the operation of the machine manual functions for the operator.

2. Related Art

A human machine interface of a machine includes a display, an optional pointing device, and pushbuttons, which provide the functions for data entry, screen selections, machine operation selection and actuation of manual operations. In molding systems, an individual dedicated pushbutton is assigned to each independent machine manual operation. As the injection molding processes become more complex, the demand for more functions and operations to be provided by a machine controller also increases. For processing molds with multiple cavities or complicated parts, an increasing number of mold functions—multiple ejectors and air blow functions for parts removal, and multiple core actuators to form complicated parts—are required in addition to the basic machine functions. This imposes a huge burden on the operator to find the right buttons to push during manual operation. See, for example, FIGS. 3 and 4. In addition, manual operations which require several functions to be operated at the same time become more difficult. As the number of pushbuttons increases, the human machine interface, which also serves the function of a control panel, will have to be increased in size. For small size machines that are required to provide demanding molding functions, the size of their control panels may grow to the point that the maneuvering area of the operator is greatly reduced.

SUMMARY OF THE INVENTION

In view of the above-elaborated problems, it is an object of this invention to provide apparatus and method for controlling a molding machine, and to provide a compact human machine interface to improve the ease of operator maneuvering.

It is further an object of this invention to provide a common human machine interface for all products, with the same look and feel to reduce the learning and training of products' users.

It is further an object of this invention to simplify the operation of manual machine functions by dividing the functions into functional groups for fast operation.

It is further an object of this invention to provide the means to customize the operation of manual machine functions. The scope of customization includes, but is not limited to:

1. selecting groups of user preferred functions from the set of installed functions;
2. assigning several functions to a single pushbutton for simultaneous actuation;
3. constructing a sequence of operations from the set of installed functions for performing a sequence of manual functions automatically during manual mode.

It is further an object of this invention to provide a means for storing and restoring the customization of each operator.

It is further an object of this invention to maximize the real estate of the display for displaying the machine's process variables in real time when some of the manual machine operations are not in use.

The human machine interface of this invention preferrably has a control panel comprising:

a) a flat panel display screen;
b) a pointing device;
c) a plurality of pushbuttons overlaid with or without icons;
d) a housing containing the above and the associated electronics;
e) means to uniquely identify each users preferred configuration;
f) means to connect to a remote controller for both digital information and video signal communication;
g) a connection for receiving external power to drive the panel's electronics and display;
h) software running in the remote controller to provide all the operating functions of the human machine interface.

DETAILED DESCRIPTION OF THE PRESENTLY PREFERRED EMBODIMENT.

1. Introduction

The advantageous features of the present invention will be described with respect to the plastic injection molding system or machine, for example, as described in co-pending U.S. application Ser. No. 09/166,738, filed Oct. 5, 1998, incorporated herein by reference. However, the invention is not limited to such embodiments, but may be applied to any molding technology within the scope of the attached claims.

2. The Architecture

The control architecture according to the present invention provides both real-time control of the injection molding system and real-time interface with the operator controls. The architecture also includes the human machine interface (HMI) required for the operation and monitoring of the injection molding system, as well as an interface to the factory and corporate headquarters for information exchange. Software and hardware are integrated to convert a general purpose computer into a system controller which not only controls the machine functions and the operator controls, but has an open architecture to enable easy integration of any ancillary equipment and information exchange with external systems and networks. In addition, the general purpose computer is extended, by additional hardware and software, to provide deterministic real-time control of an injection molding system to achieve high performance and intelligent manufacturing cells.

Figure 1A:
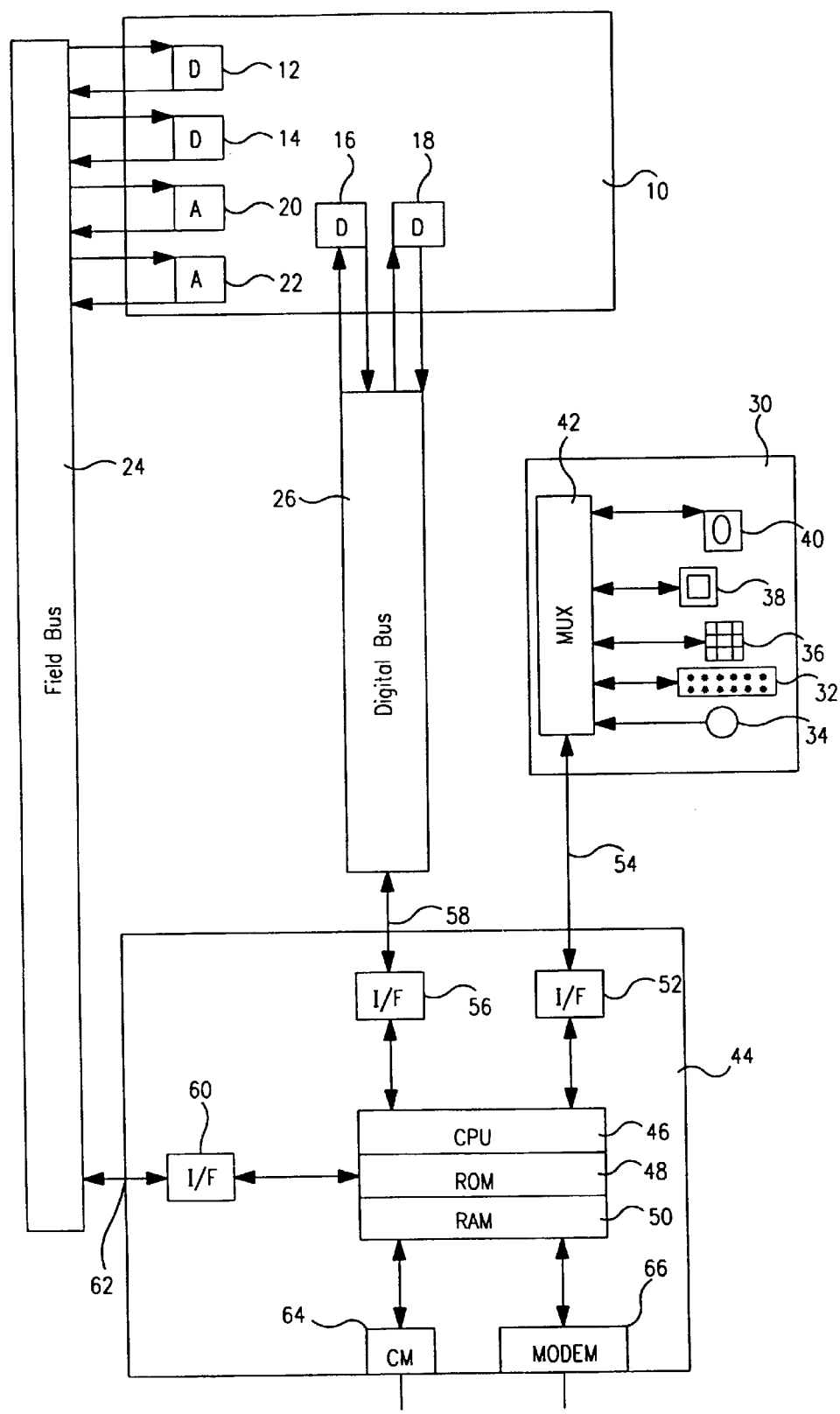
FIGS. 1A and 1B are block diagrams of the hardware architecture in a preferred embodiment according to the present invention.

FIG. 1A is a schematic block diagram showing the general features of the injection molding system control architecture according to the present invention. In FIG. 1A, an injection molding system or machine 10 carries out injection molding processes utilizing digital devices 12, 14, 16, and 18, and analog devices 20 and 22, in a well-known manner. Each of the digital and analog devices preferably includes input for driver control and an output which provides feedback signals used in closed loop control of the device. Digital devices 12, 14, and analog devices 20, 22 preferably receive control signals from, and output feedback signals to, field bus 24 (to be described below); while the digital devices 16 and 18 receive control signals from, and output feedback signals to, digital bus 26 (to be described below). Of course, depending on the particular injection molding system being controlled, either the field bus 24 or the digital bus 26 may carry all necessary control and feedback signals to control the injection molding process.

A human machine interface (or control panel or station) 30 is used by the operator to input control data and to view process feedback information. The HMI 30 has a keyboard 32 and a pointing device (such as a mouse) 34 which are used by the operator to input data. A system function keypad (which may include an LED display) device 36 may also be used by the operator to input specific machine commands, depending upon the system to be controlled. A display 38 provides the operator with at least one viewing device for observing a display based on feedback signals, and provides an interface for manually input data. A removable storage device drive 40 (such as a floppy disk drive) may also be located at the control panel 30 for the operator to input programmed control information, new control programs, or to download feedback data to a removable storage device. The control panel 30 also includes a multiplexer 42 (to be described below) which multiplexes the various control and feedback data between the HMI 30 and the general purpose computer 44.

The general purpose computer 44 is preferably an off-the-shelf personal computer having a CPU 46, a ROM 48, and a RAM 50. Preferably, the computer 44 includes a control panel interface 52 which is coupled to the multiplexer 42 of the HMI 30 through a bi-directional, greater than 1 Gigabit per second serial bus link 54 (to be described below). The interface 52 is preferably a Beckhoff Industrial Electronics CP-Link PC Multiplexer. While not shown, the general purpose computer 44 may be equipped with such peripherals as a CRT, a keyboard, a disk drive, a CD-ROM drive, a mouse, a touch screen, a light pen, etc.

The computer 44 also has a digital interface 56 which is coupled to the digital bus 26 through a connection 58. Likewise, the computer 44 has an interface 60 which is coupled to the field bus 24 through a connection 62.

The computer 44 also includes a local area network interface 64 which may be coupled to a local area network (e.g., Ethernet; not shown) used within the factory. Also, the computer 44 may include a modem or other external interface 66 which may be used to connect the computer 44 to, e.g., the internet or an intranet.

With the structure described above, the control architecture according to the present invention can conduct true real-time, closed loop control of the injection molding devices 12–22 without the need of a PLC or an ASP, as were required in the prior art. Additionally, the operator can control the injection molding process from the HMI 30 through the computer 44. The computer 44 has sufficient processing speed and power to multi-task process both the injection-molding functions and the HMI functions. For example, the computer 44 may process instructions for the high-priority closed-loop controlled injection molding devices in foreground, while processing instructions for the lower-priority HMI functions in background. Thus, the computer 44 will interleave processing of machine control functions and HMI functions.

As noted above, the single, general purpose computer according to the present invention includes a hardware architectures similar to that of a standard, general purpose commercial or industrialized personal computer, and preferably operates under a general-purpose operating system such as Windows NT (Tm). Preferably, the computer 44 is a Model C6150 Industrial PC from Beckhoff Industrial Electronics. This PC features a Pentium II microprocessor with a 2.0 Gigabyte (or higher) hard drive, and a 64K RAM memory. The computer may also be equipped with a CD ROM drive, 1.44K and/or 120 MB disk drives, four serial interfaces, a printer interface, and several (e.g. seven) slots for additional cards. Interfaces for local area networks and/or internet/intranet connectivity are preferably installed in the extra slots. The computer is capable of simultaneously multi-tasking at least three functions, i.e., control of the injection molding system, control of the HMI, and serving as a plant-wide network server.

The computer 44 performs A/D and D/A functions in order to receive the analog feedback signals and provide analog control signals through the field bus 24. Thus, the computer 44 processes all control programs, HMI programs, and network programs in the digital regime. By operating in the digital regime, the computer 44 provides better performance and more accurate solutions than traditionally offered by analog circuitry. The high computation power and generous working memory size of the computer 44, together with a software real-time extension kernel (to be described below) provides real-time performance for machine control, HMI functions, and network functions. Since the real-time extension kernel operates on microsecond resolution, the computer 44 operates as a multi-tasking scheduler for all computer functions. That is, the computer 44 may simultaneously.control all of the injection molding devices using multi-tasking processing. Additionally, such machine control functions can be multi-tasked together with the HMI functions and/or the network functions. The system is capable of achieving injection molding device control loop updates on the order of milliseconds, which renders the use of an analog closed loop controller for real-time control of the injection molding devices unnecessary.

Thus, the computer 44 can control the injection molding devices using a plurality of predetermined device-control programs, (e.g., resin injection, mold clamp operation, etc.), and also controls the HMI 30 utilizing a plurality of predetermined HMI programs (e.g., display, keyboard, mouse, keypad, etc.). The computer 44 also networks with other computing devices through a local area network (and/or the internet) utilizing a plurality of predetermined programs such as internet browsers, word processing programs, spreadsheet programs, etc. Not only does the computer 44 operate a plurality of such control and networking programs, it can do so in real-time by multi-tasking the processing in accordance with a predetermined priority, such as critical injection molding devices first, feedback and status devices second, MHI devices third, and network communication functions last. Moreover, the open architecture of the computer 44 allows any of these predetermined control and networking programs to be modified, upgraded, installed, or changed, as required.

Not only does the computer 44 o bviate the need for an ASP, it also replaces the PLC used at the prior art. The ability to easily install new application program software into the computer 44 provides a method of mapping process inputs/outputs to process images which can be displayed to the operator. The computer 44 is enabled with input and output capabilities as well as a real-time kernel extension to its general-purpose operating system and programming software, in accordance with an international industrial standard such as IEC 1131-3. Thus, the computer 44 replaces the commonly used PLC or proprietary controllers which control the operating sequences of various injection molding system devices to perform the required injection molding functions. In addition to acting as the master for controlling the machine functions, the computer 44 also acts as an information archive which concentrates all operational information of the machine devices and machine status which may then be transmitted to a factory supervisory system.

The HMI (or control panel or station) 30 is used to input control information to control the injection molding devices 12–22, and to receive feedback from those devices for display, storage, or transmission. The HMI 30 includes such standard control equipment as the keyboard 32, the pointing device (mouse) 34, the keypad 36, the removable storage device 40, the display 38, and the multiplexer 42. Preferably, the HMI 30 is a Beckhoff CP7000 series control panel having special PLC keys with LED displays, a touch screen, a 15 inch TFT display, a PC keyboard, a 3 and ½ inch disk drive, and a CP-Link interface.

In the present invention, the effectiveness of the communication between the HMI 30 and the computer 44 is greatly improved due to the integration of the operator interface and machine control functions into a single general purpose computer which eliminates the processing bottleneck normally imposed by the communication links between the HMI, the PLC, and the ASP, as used in the prior art.

Figure 1B:
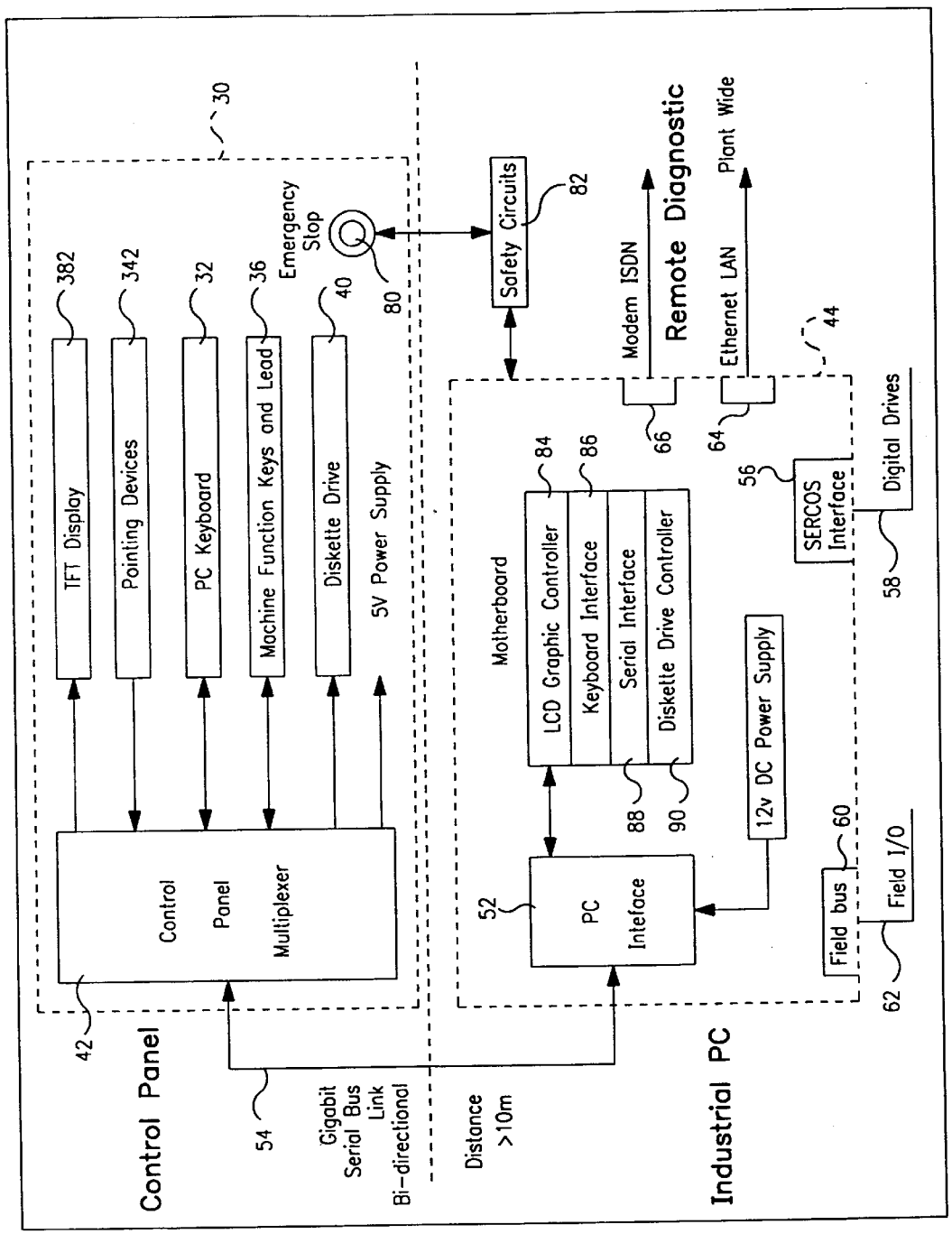

Referring to FIG. 1B, the HMI 30 is shown connected to the computer 44 through the greater than 1 Gigabit serial bus link 54. The use of such a high speed bi-directional multiplexed bus between the HMI 30 and the computer 44 allows the physical separation of the operator control and the display elements from the computer 44. In the preferred embodiment, the link 54 is as long as 50 meters, although lesser lengths such as 10 meters may be appropriate. By housing the computer 44 away from the HMI 30, all delicate computer devices such as hard disk drives, modems, the CPU, etc. can be protected from the heat, vibrations, and impacts normally encountered in an injection molding environment. This high-speed link enables the HMI 30 to be installed near the machine 10 and at an optimum location for ease of operation while maintaining a sufficient separation from the computer 44. For this reason, the electronics residing inside the HMI should be the minimum required to display data, allow data input, and facilitate manual command functions through the keyboard 32, the pointing device 34, and the function keypad 36.

In FIG. 1B, the display at the HMI is preferably a TFT display 382, although the display may be an LED, an LCD, a CRT, or other equivalent display devices. The HMI 30 also includes one or more pointing devices 342 which may comprise a mouse, light pens, a touch screen devices, etc. The keyboard 32 is, preferably, a standard PC keyboard, although specialized keyboards with specialized function keys may be used. The machine function keys and LED display 36 are those typically found in known injection molding systems. The removable storage device 40 is used to input control program or setpoint information, or to store feedback signals. The above-discussed input and output devices are connected to the HMI multiplexer 42 which multiplexes the information for transmission over the greater than 1 Gigabit serial bus link 54. The multiplexer 42 also controls a 5 volt power supply (not shown). Lastly, the HMI 30 may include an emergency stop button or device 80 which may be used to stop the injection molding devices in an emergency. The emergency stop button 80 is connected to safety circuits 82 which, in turn, are connected to the computer 44 through an interface (not shown).

The link 54 provides bi-directional communication between the HMI and the computer 44, and this greatly simplifies the architecture and improves the reliability of the system. The bi-directional link 54 connects the HMI 30 to the computer 44 for video control and data input. The computer 44 thus processes the bulk of HMI information instead of the HMI 30. The speed of communication between the HMI 30 and the computer 40 is in the Gigabit/s range, and this allows the computer 44 to provide real-time response from operator-initiated changes to the machine devices 12–22. The link 54 can be implemented by commercially-available links such as PanelLink, products based on an international industrial standard such as IEEE P1349b, or CP-Link from Beckhoff Industrial Electronics, or equivalents. In the preferred embodiment, the CP-Link from Beckhoff is used.

The HMI 30 thus has minimum processing capability, preferably only those required to display data, allow data input, facilitate manually-controlled functions through the function keys 36, and to communicate with the operator through graphic, text, and video display. Since the computer 44 can be housed away from the HMI 30 (e.g., in a control cabinet) in a controlled environment to protect the delicate computer devices, the operator control and display functions can be moved closer to the injection molding system for closer observation of machine functions by the operator.

The bi-directional link 54 may comprise a two wire coaxial cable, two single wire coaxial cables, one or more fiber optic cables, or other communication means. No additional power supply is usually needed for the link 54. The cable interface may comprise a printed circuit board connected to a standard personal computer bus (e.g., ISA, or PCI), and therefore may be used with any general purpose computer.

As shown in FIG. 1B, the computer 44 may include additional structure to that depicted in FIG. 1A. In particular, the computer 44 preferably also includes an LCD graphics controller board 84 for controlling the display 382. Preferably, the controller 84 includes an LCD interface. The computer 44 also includes a keyboard interface 86 for keyboard 32, and a removable storage device controller 90, which controls the removable storage device 40. The serial interface 88 is used to control the serial communication ports.

Signals from the computer interfaces for the LCD, the keyboard, the pointing devices, the communication ports, and the removable storage devices are converted by the PC interface link board 52 to a high frequency serial signal which is then transferred to the HMI 30 through the link 54. The HMI multiplexer 42 converts the serial signal back to the original computer interface-generated signals, which are then transmitted to the various devices for control and feedback. Thus, the devices on the HMI 30 may be controlled from the computer 44 over much longer distances than would normally be possible. Since the link 54 preferably has at least two separate channels, there is a link channel for each communication direction between the control panel 30 and the computer 44.

The computer 44 also includes an interface 56 for interfacing directly, when required, to digital devices 16 and 18 over the digital bus 26, as seen in FIG. 1A. Preferably, the interface 56 is a SERCOS (Serial Real-time Communication System). Again, the open architecture of the computer 44 allows control of injection molding devices 16 and 18 directly through the digital bus 26 or, alternatively, through the fieldbus 24.

3. The HMI

Figure 2:
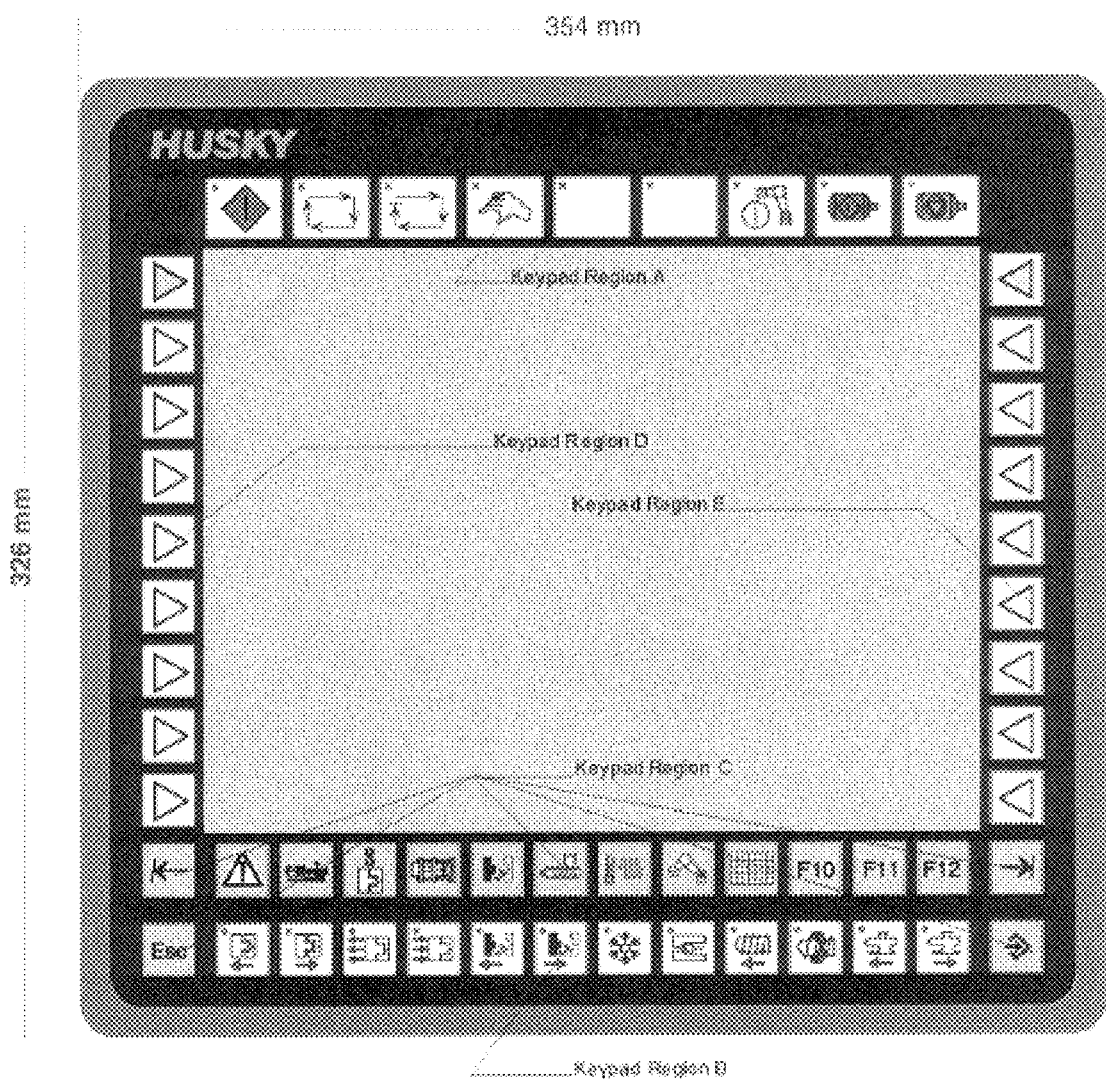
FIG. 2 is a drawing of a front panel of the human machine interface in a preferred embodiment according to the present invention.
Figure 3:
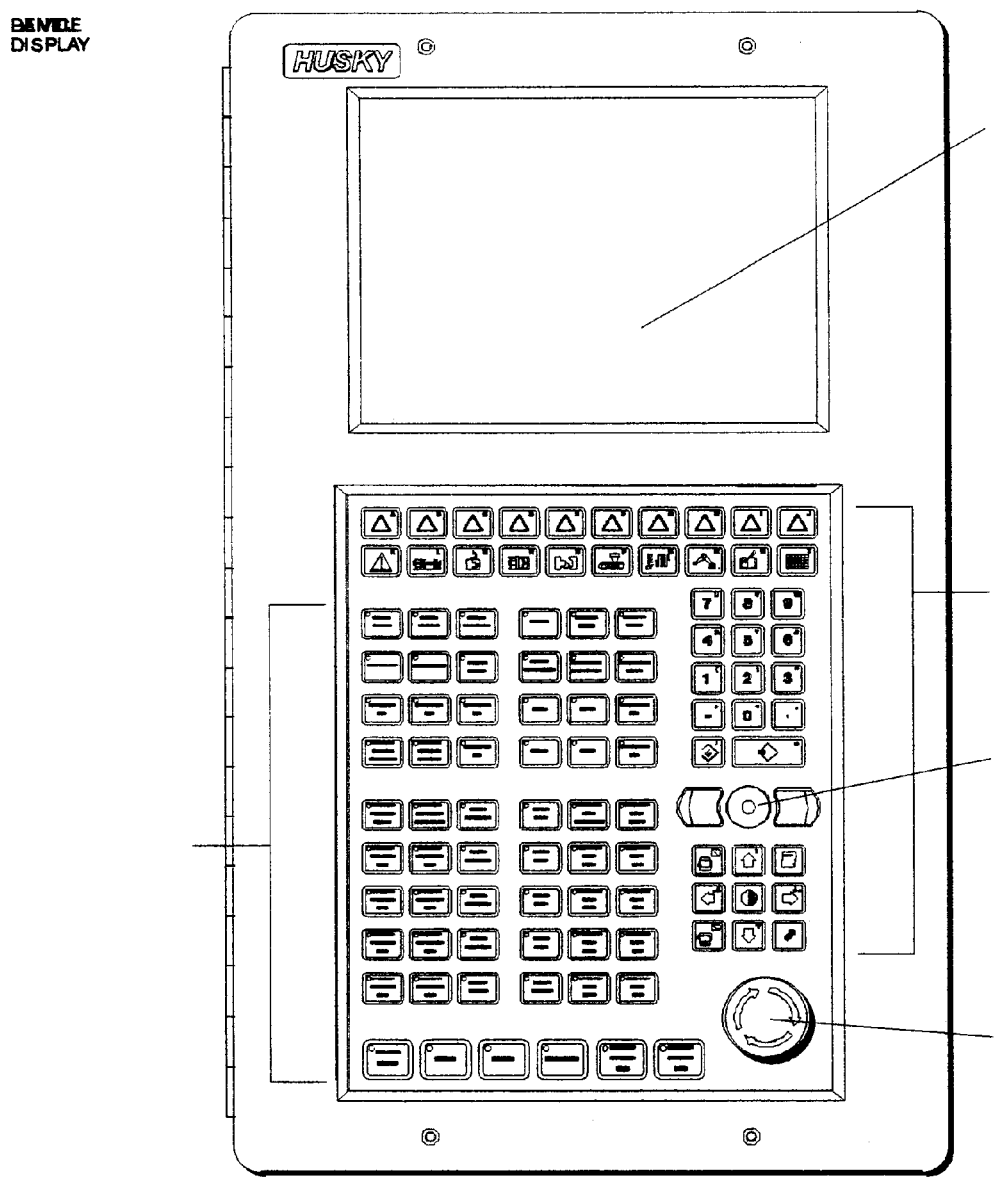
FIG. 3 is a drawing of a prior art front panel of a human machine interface that has sixty dedicated manual control function keys.
Figure 4:
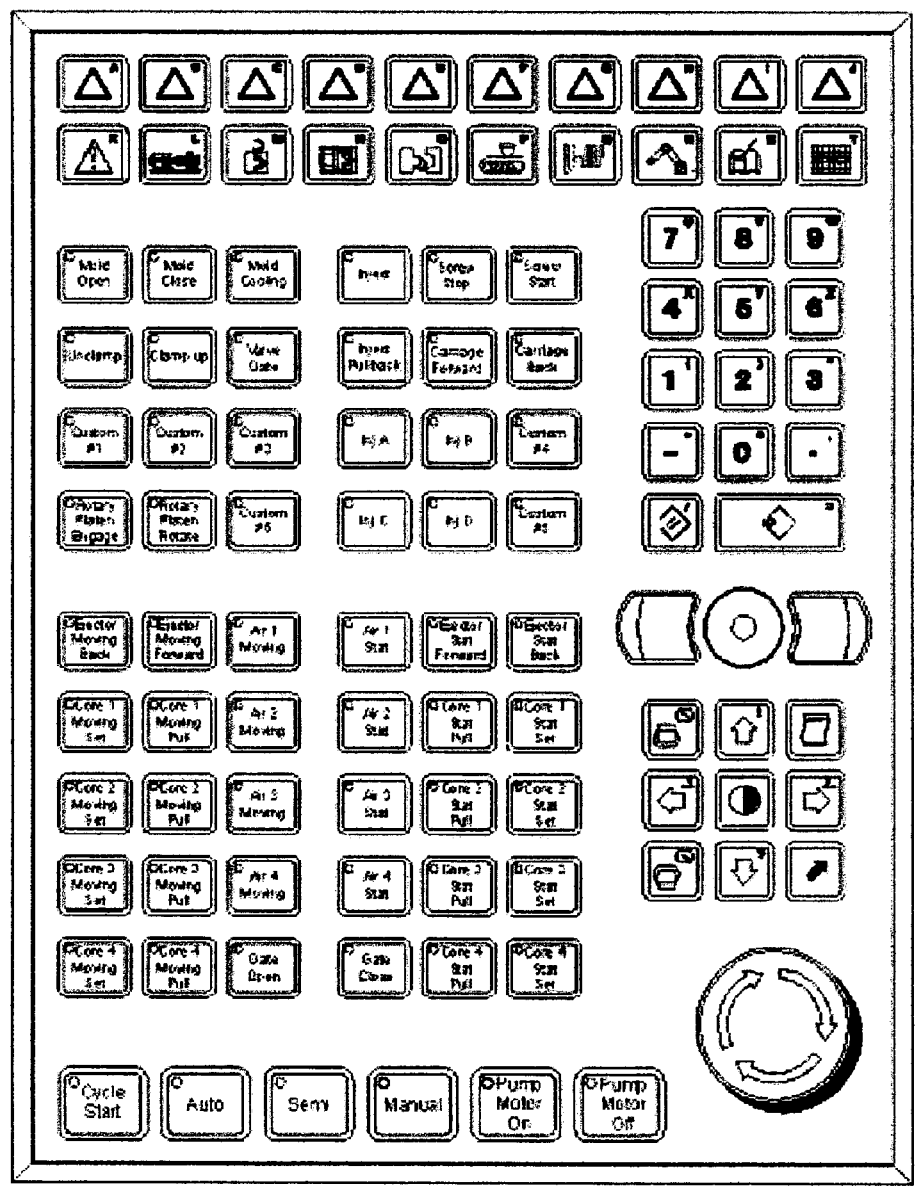
FIG. 4 is a enlarged view of the prior art front panel of a human machine interface with the sixty dedicated manual control function keys.

A human machine interface for machine control according to the present invention is preferably embodied in an improved operator control device depicted in FIG. 2. Such a device enables simplification and customization of machine manual operation, and improves the ease of use of the machine. Its graphical user interface provides the flexibility and functions to present information in a simple, more direct manner than other existing control systems. Intelligent set-up and the use of a touch screen, as the pointing device to retrieve information, simplify how the operator accesses information. The enhanced graphical representation and easily recognizable icons further simplify the presentation. The layout of the human machine interface is designed to make setting up and operating the machine easy. The most commonly used manual control functions are activated by pushbuttons around (along the top and bottom in a preferred embodiment) the human machine interface display. Other manual operation functions are also organized around (into two "sidebars" located along each side of the display in a preferred embodiment) the display. These sidebars can be reconfigured according to individual mold or process requirements. Manual operation functions are divided into pre-defined groups, which are represented by graphical and/or textual icons. They are selectable by the operator to actuate the desired manual operation functions. A function is provided to the user to customize the operations by selecting the individual's choices from the predefined manual operation functions to form a personal group. Additional functionality is provided to allow assignment of several independent manual operations into a single function icon to achieve a one-button operation. The configuration of screens and sidebars is stored on a memory device that may be unique to each operator; accessing the device configures the human machine interface accordingly. The sidebar interface further includes the function of displaying real-time process variables and hence maximizes the usage of the display's real estate.

The preferred embodiment depicted in FIG. 2 includes the below-described methods and means to simplify the manual machine functions.

Figure 5:
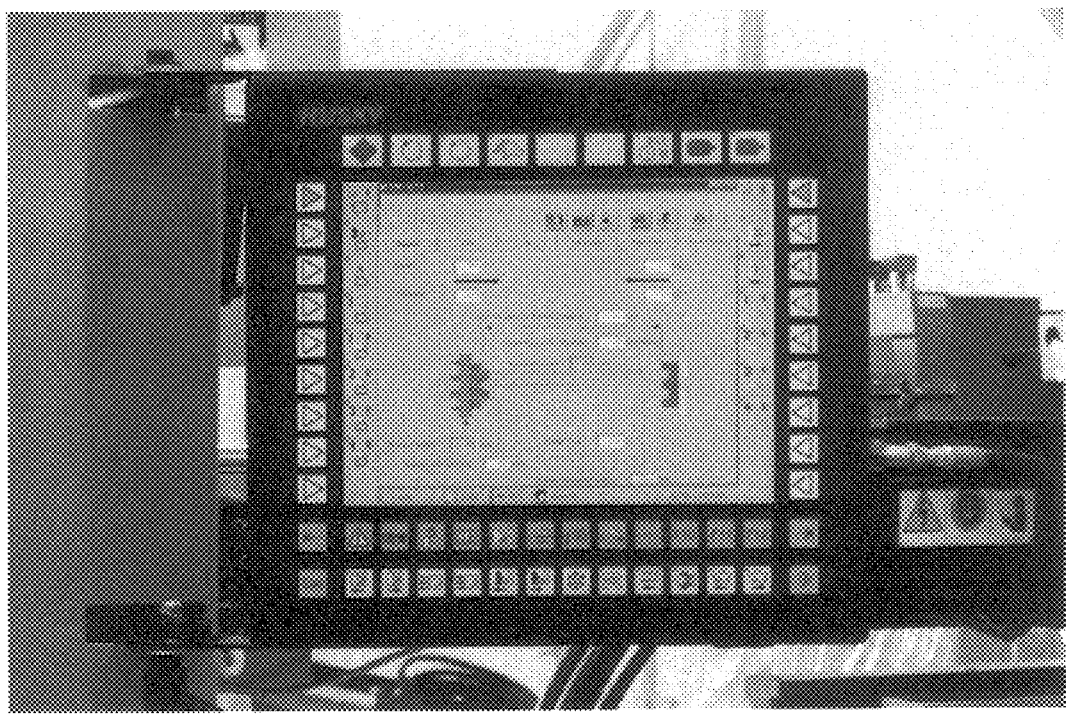
FIG. 5 is a picture of a front view of the human machine interface in a preferred embodiment according to the present invention.
Figure 6:
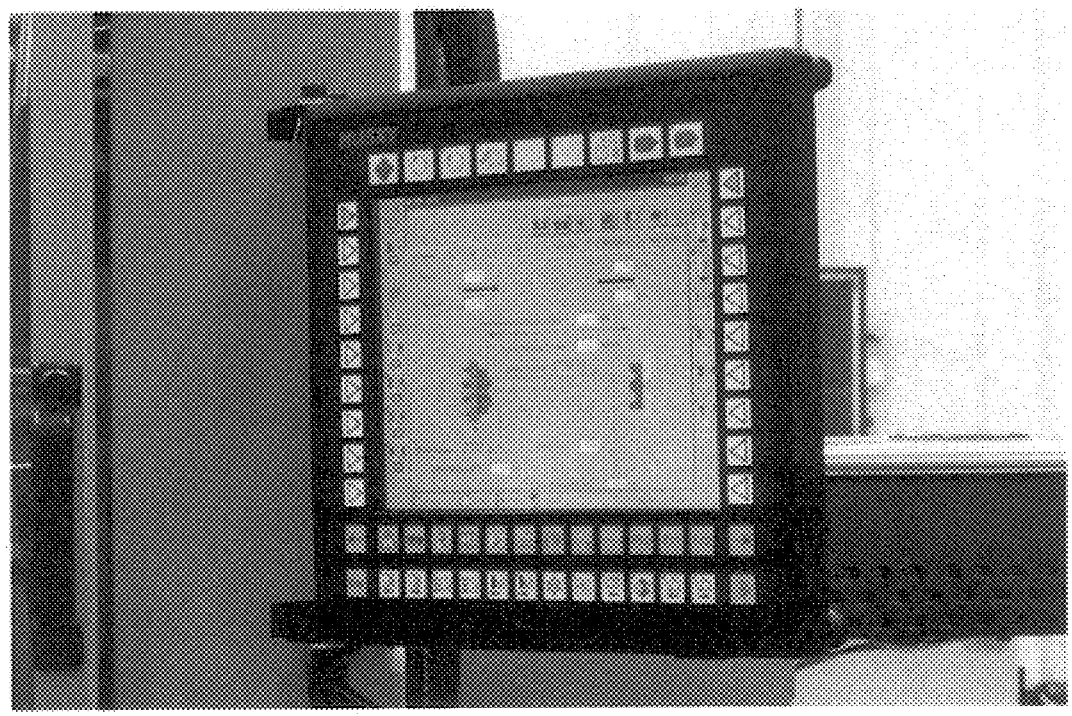
FIG. 6 is a picture of the human machine interface at an angle in a preferred embodiment according to the present invention.

As shown in FIGS. 2, 5, and 6, the manual machine functions are divided into classes; a minimum of two classes is formed: commonly used basic control functions (BCF) and application specific control functions (ASCF).

The commonly used basic control functions are those functions which are typically required to operate an injection molding machine such as cycle start, automatic cycle mode select, semi-automatic cycle mode select, manual mode select, robot engage select, pump on, pump off, closing the mold, opening the mold, clamping up the mold, unclamping the mold, moving machine ejector back, moving machine ejector forward, turning mold cooling on/off, opening/closing injection shut-off nozzle, purging, plasticizing, moving the injection unit forward and moving the injection backward.

Each dedicated control function pushbutton is installed with a device to act as a confirmation of the activation of the selected function.

The application specific manual control functions include, but are not limited to, plurality of air blow functions, plurality of core functions for set and pull operations, robot related operations, product handling operations and ancillary equipment operations, whenever such application specific functions are included in the molding system.

Rows of dedicated BCF pushbuttons (one on the top and one on the bottom of the display in a preferred embodiment), with pre-defined icons are installed on the control panel. The pushbuttons are preferably mechanical buttons or touch pad keys which correspond to the icons shown on the screen next to the buttons. Together, they provide all the basic control functions for operating the machine. Alternatively, the pushbuttons may be part of a touch screen display panel, although it is preferred that the buttons be dedicated mechanical buttons so that the screen's real estate can be devoted for information display and other configurable functions.

Preferably, no hardware indicating device is installed with the application specific manual control function pushbuttons. Instead, each icon, which is assigned to a pushbutton of this category, may change its appearance to indicate the activation of the selected functions. The indicating object, forming part of the icon, is provided to confirm the activation of the function. They indicate when the functions are selected. For security purposes, all installed application specific manual control functions preferably should only be activated by pressing the pushbuttons on the sidebars. Preferably, pressing the icons directly will not activate the pre-programmed manual control function. This is to avoid accidental activation of manual functions during the navigation of the display by the touch screen pointing device.

Figure 7:
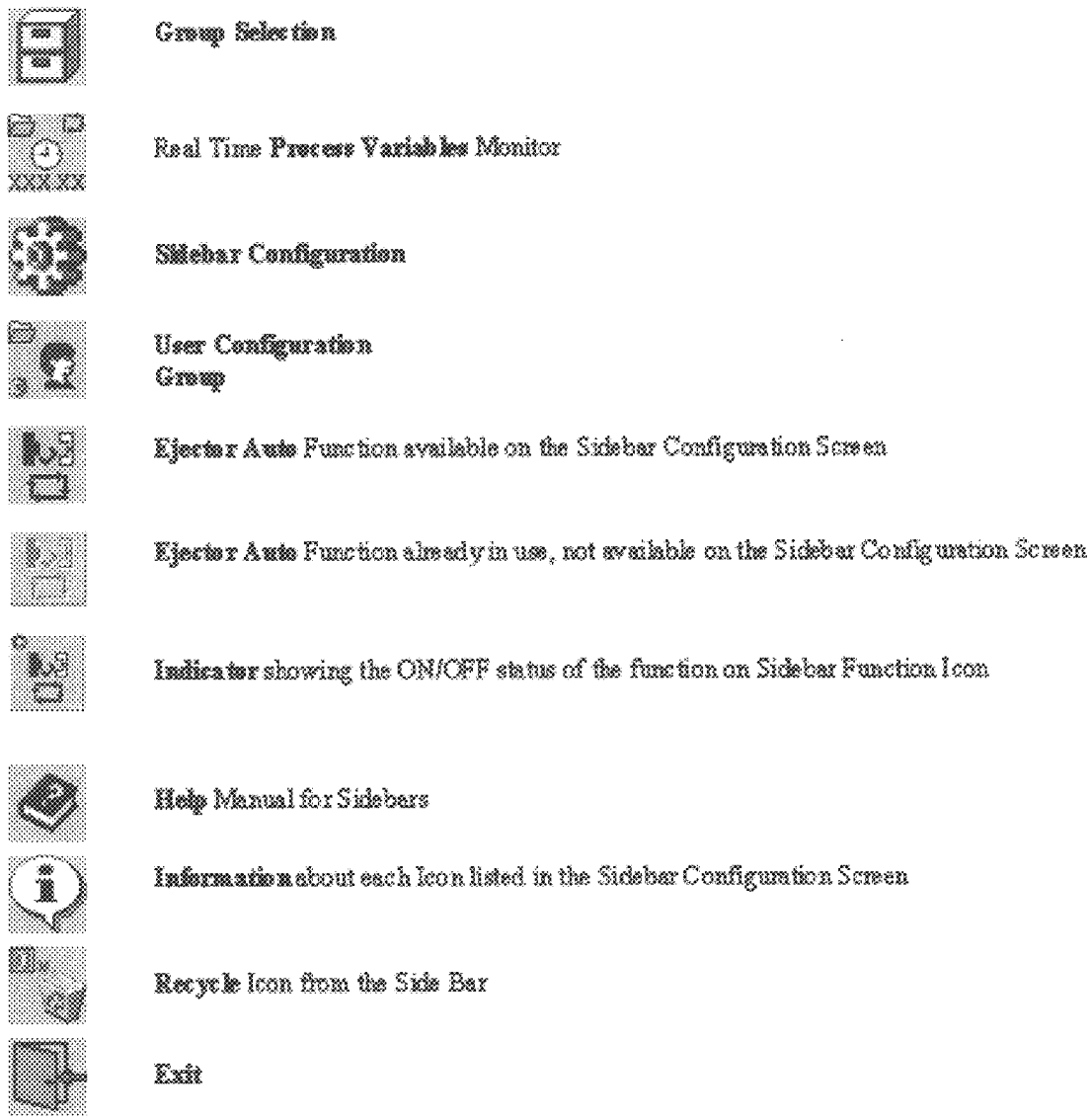
FIG. 7 is a selected list of icons of a preferred embodiment for the purpose of describing the art.

As shown in FIGS. 5, 6, and 7, Columns of sidebars comprising ASCF pushbuttons, (one on the left and one on the right of the display in the preferred embodiment), with software driven icons for configurable functions are installed on the control panel. Together and with the hereinafter described methods, they provide all the application specific control functions.

It is clear from the above that by means of multiplexing the application specific control functions into the two columns of sidebar pushbuttons, the operator control panel can be reduced in size.

The application specific control functions are divided into groups, which are formed by control functions either related to multiple actuators of a similar nature or functions of multiple sub-systems. As an example, the function group for air blow operations may have icons for a plurality of independently operated blower devices. As another example, the function group for robot operations may have functions for multiple independently-operated axes. By taking this design hierarchy, the system can be expanded to satisfy any special functions.

As will be described in more detail below, pressing the dedicated pushbutton (top button in a preferred embodiment) of each column of sidebars will display all the icons of the function groups adjacent to the remaining pushbuttons. The user can then select, by pushing the appropriate button, the group of factory pre-set control functions or user-defined control functions by pressing the group icon. Thereafter, the group icon will replace the top icon and the icon of each control function of the group will appear adjacent to each pushbutton. The operator can then actuate and/or select the functions required, again, by pushing the appropriate button. The control system supports multiple pushbuttons to be activated at the same time. Therefore, the operator may activate several control functions. As an example, the control hardware allows the controller to identify that multiple mechanically-actuated pushbuttons are actuated and to decode the selected operations by the operator. By pressing multiple pushbuttons, such as the corresponding pushbuttons of the "clamping the mold up" function and the "moving the injection unit forward" function, both functions are performed at the same time. This contributes to the speeding up of the manual machine operation.

Figure 8:
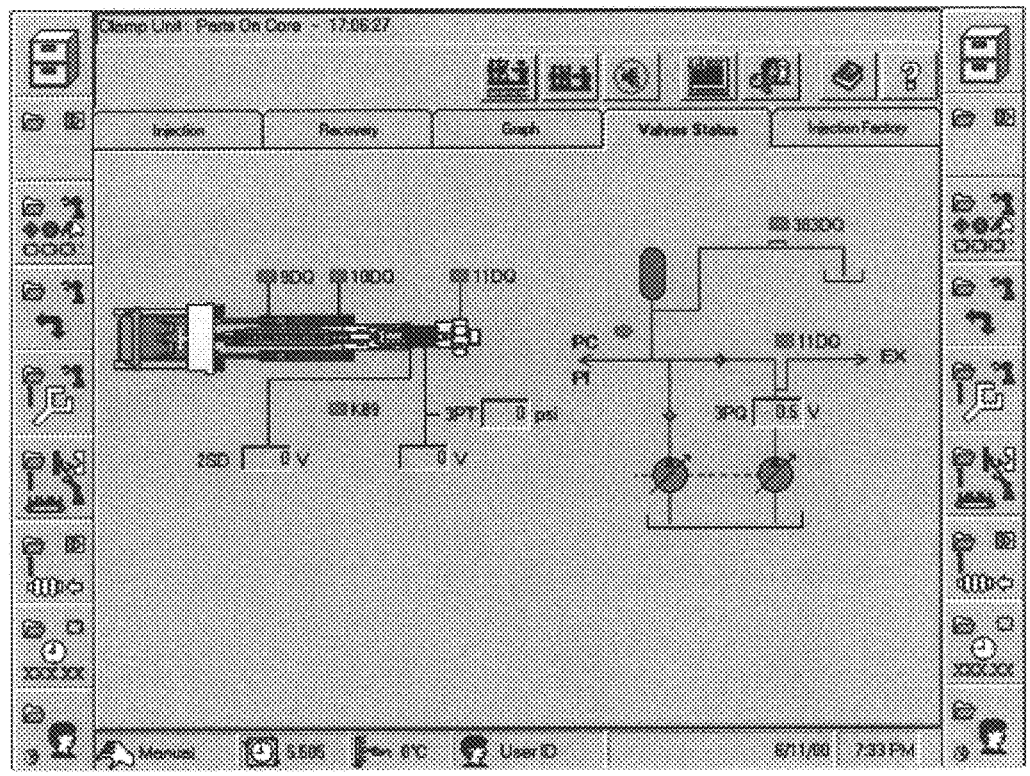
FIG. 8 is a view of a screen displaying the appearance of the sidebars with function group icons, appeared after the Group Selection icon is selected.
Figure 9:
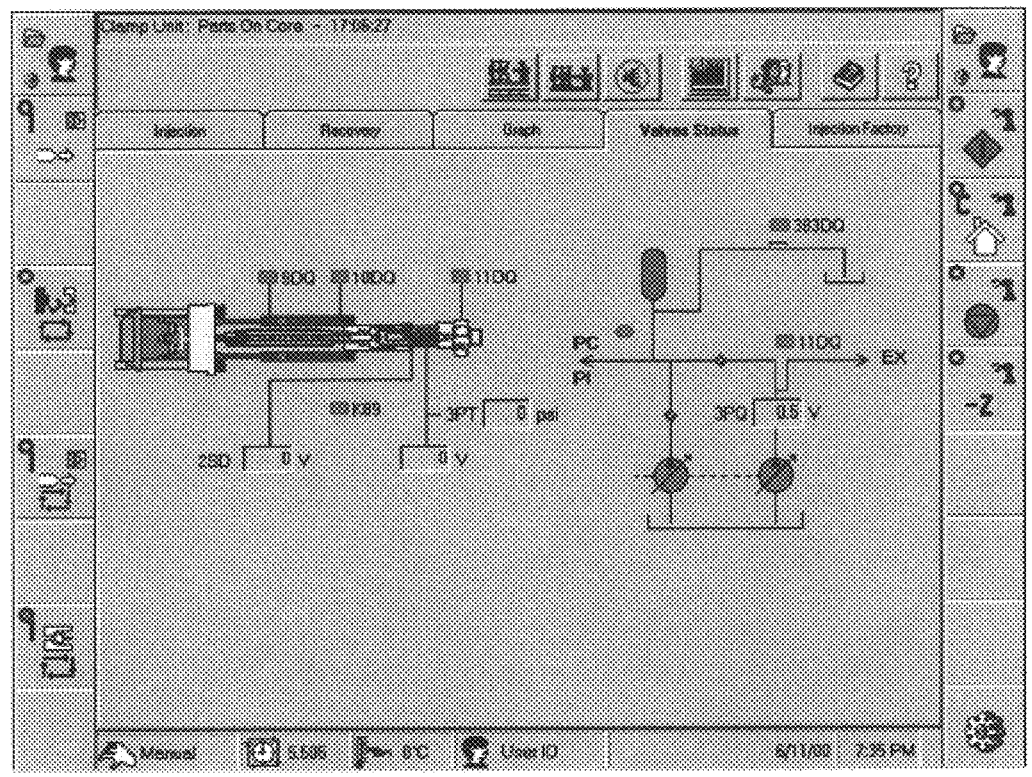
FIG. 9 is a view of a screen displaying the appearance of the function icons after the User Configuration icon is selected.
Figure 10:
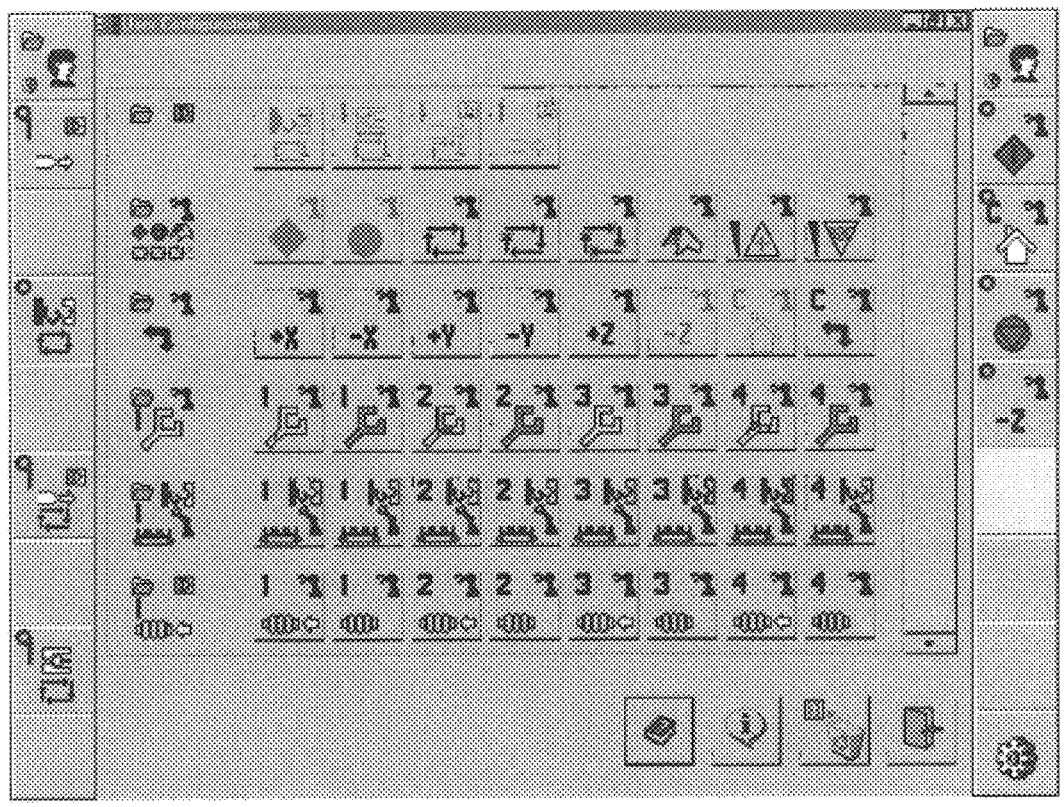
FIG. 10 is a view of a screen displaying the appearance of the sidebars together with the User Configuration Screen after the Sidebar Configuration icon is selected; in addition, a selected location to be configured is highlighted.

In addition, it is also possible to customize the sidebars for each system user. In a preferred embodiment the procedure to customize the sidebars is as follows:

The pushbutton associated with the "Group Selection" (top) icon of either sidebar is pressed; and a column of function group icons appears adjacent to the sidebar pushbuttons. See FIG. 8. The pushbutton associated with the "User Configuration Group" icon is pressed, and the icons of the current user's customized functions replace the Function Group icons on the both sidebars. See FIG. 9. The pushbutton associated with the "Sidebar Configuration" (bottom of the right sidebar) icon is pressed, and a special icon selection screen—the "User Configuration" screen—appears. See FIG. 10. This allows addition, exchange, or removal of available machine functions. The "User Configuration" screen shows all installed machine functions/icons; unassigned ones are shown in their normal colours, assigned ones are shown greyed out.

Figure 11:
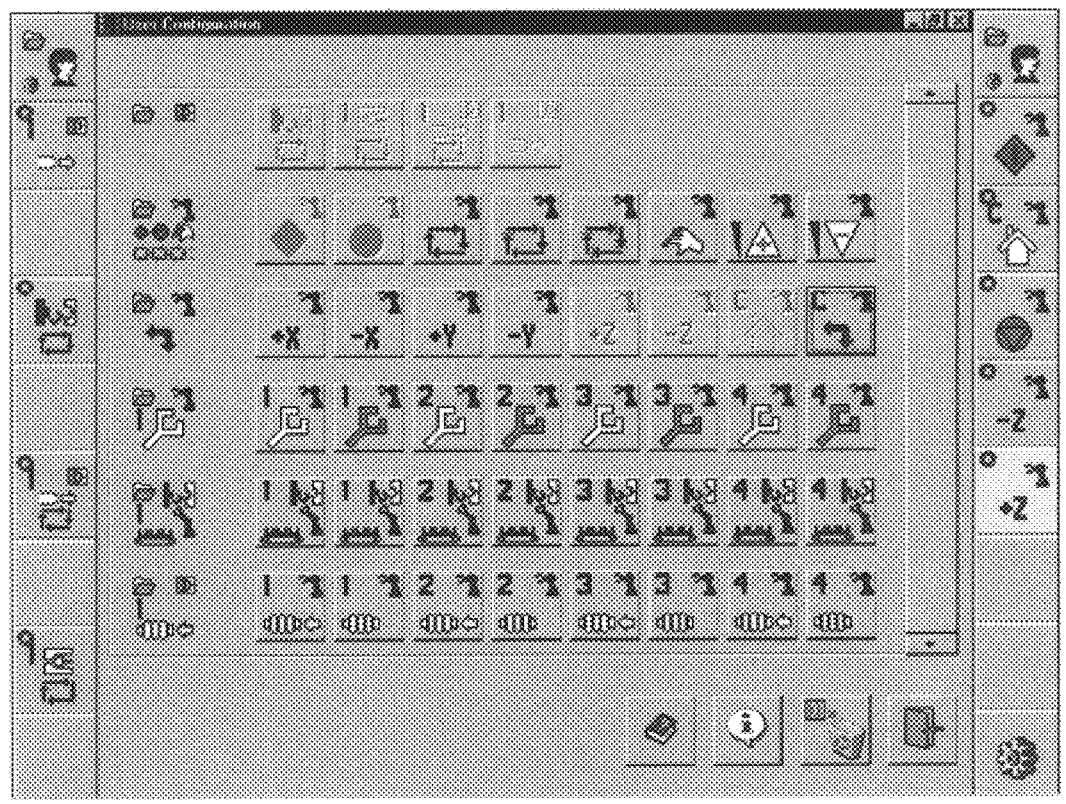
FIG. 11 is a view of a screen displaying the appearance of the sidebars after the addition of the function is selected.

Functions are added by pressing the pushbutton associated with an unassigned location on the. sidebar. Then an available function from the "User Configuration" screen is selected. The icon then appears beside the pushbutton, and is shown greyed out on the "User Configuration" screen. See FIG. 11

Figure 12:
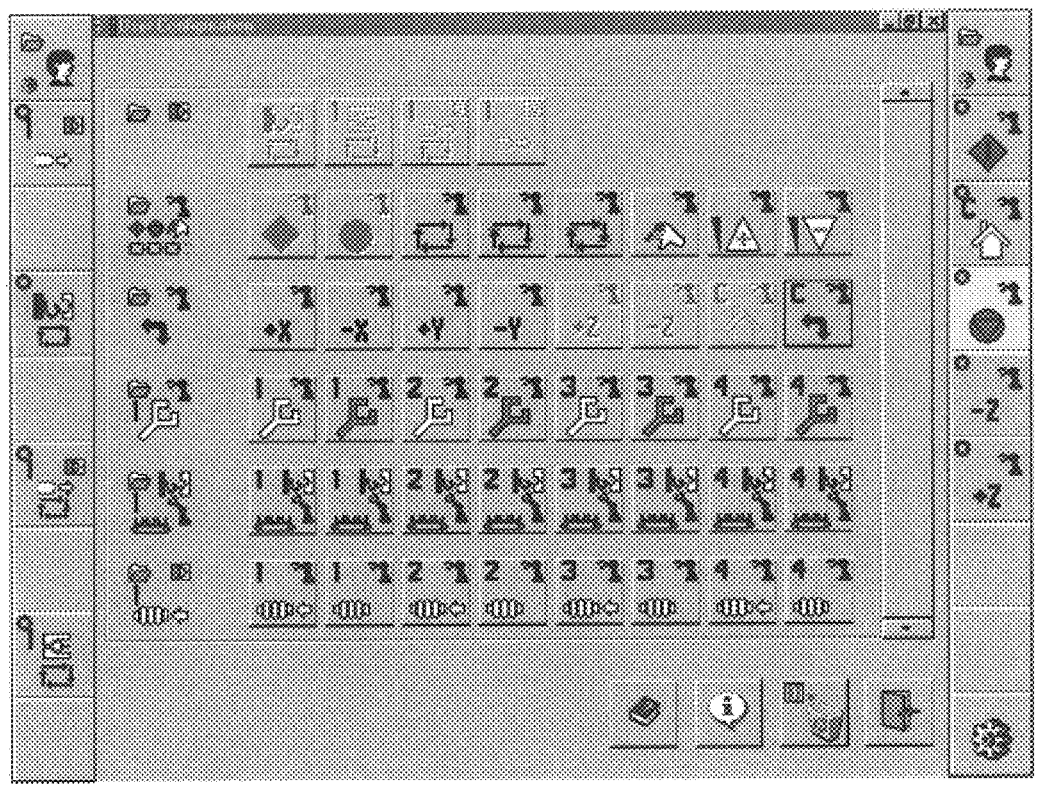
FIG. 12 is a view of a screen displaying the appearance of the sidebars after a function to be exchanged is selected.
Figure 13:
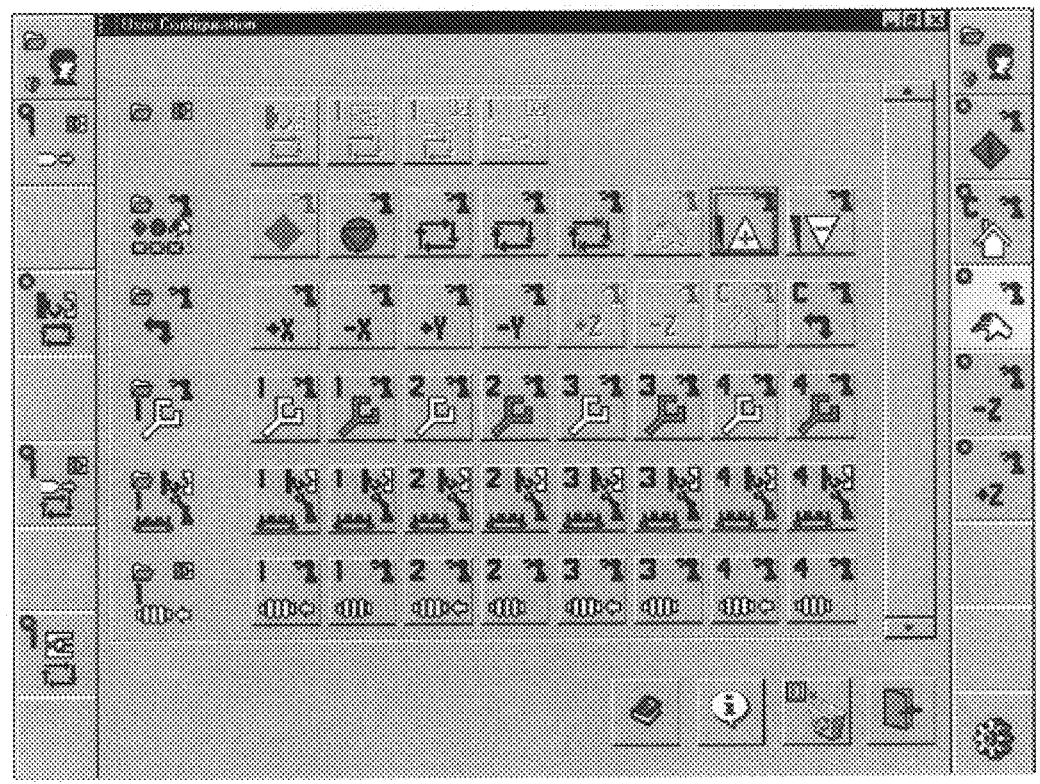
FIG. 13 is a view of a screen displaying the appearance of the sidebars after the exchange is completed.

Functions are exchanged by pressing the pushbutton associated with an already assigned location on the sidebar. An available function from the "User Configuration" screen is selected. The newly selected icon then appears beside the pushbutton, and is shown greyed out on the "User Configuration" screen, the previously assigned icon then is shown normal colour on the "User Configuration" screen. See FIGS. 12 and 13.

Figure 14:
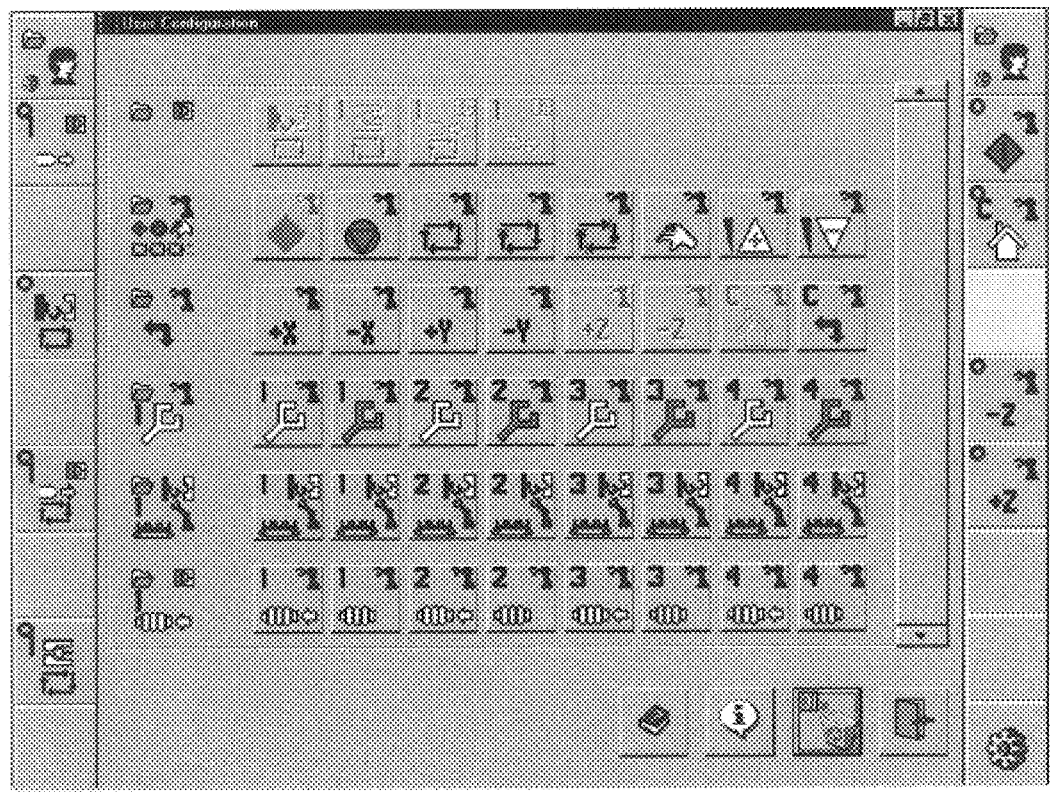
FIG. 14 is a view of a screen displaying the appearance of the sidebars after a function is removed by pressing the Recycle icon.

Functions are removed by pressing the pushbutton associated with an already assigned sidebar location. The "Recycle" icon from the "User Configuration" screen is selected. The previously assigned icon then is shown normal colour on the "User Configuration" screen, and the area adjacent to the pushbutton is shown unassigned. See FIG. 14.

Figure 19:
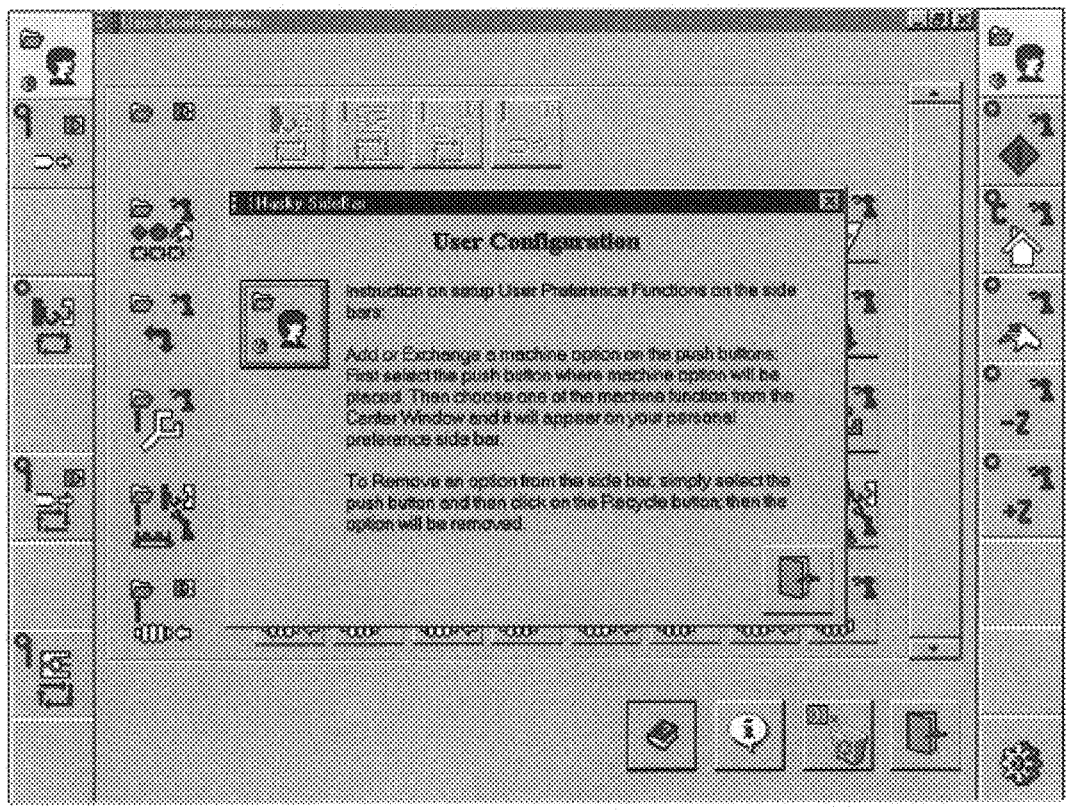
FIG. 19 is a view of a screen displaying the on-line help information on the User Configuration screen when the Help icon is selected.

Simple instruction to guide the system user through customizing the sidebars is accessed by selecting the "Help" icon. See FIG. 19.

Figure 18:
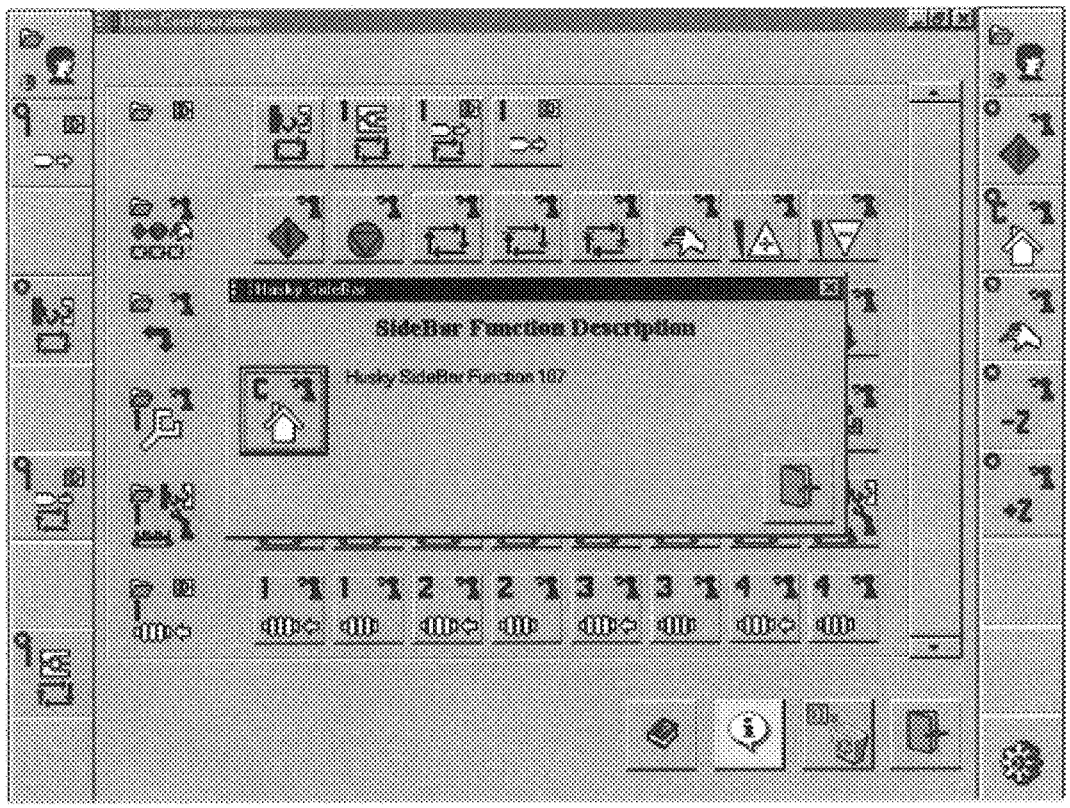
FIG. 18 is a view of a screen displaying the sidebar function description when the Information icon is selected on the User Configuration screen.

Detailed information on each icon/machine function, and instructions on how to use it are accessed by selecting the "Information" icon. See FIG. 18.

Figure 15:
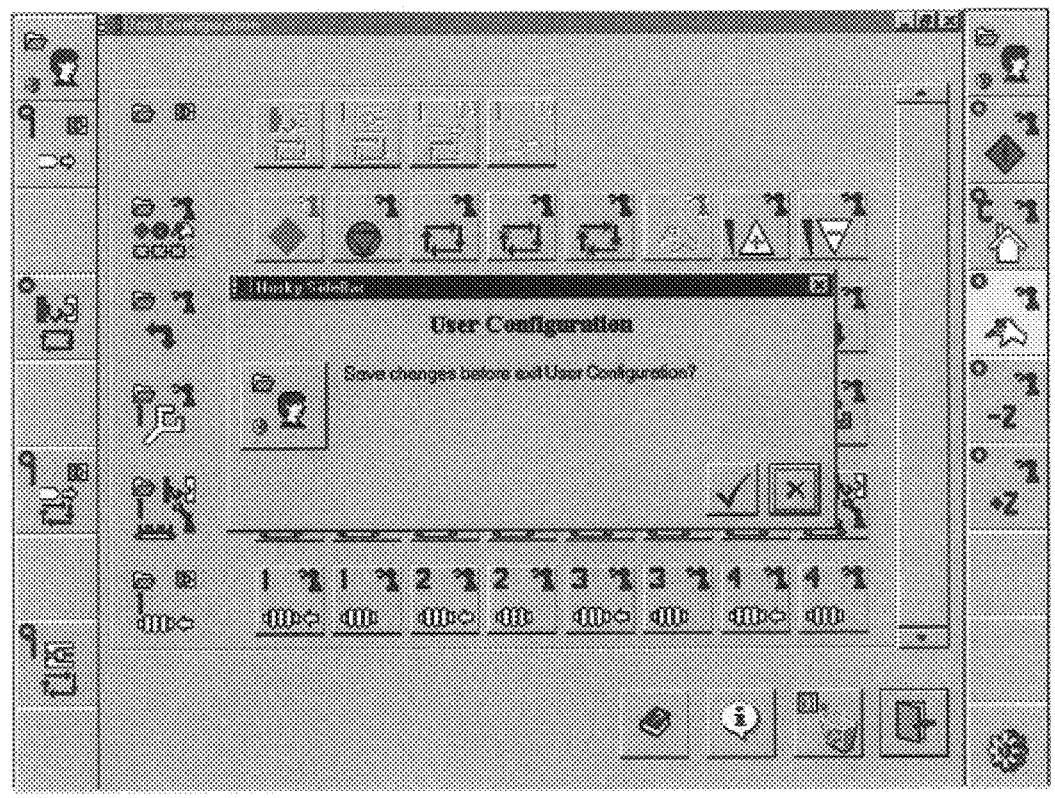
FIG. 15 is a view of a screen displaying the appearance of dialog box on the User Configuration screen when the Exit icon is touched, if changes have been made.
Figure 16:
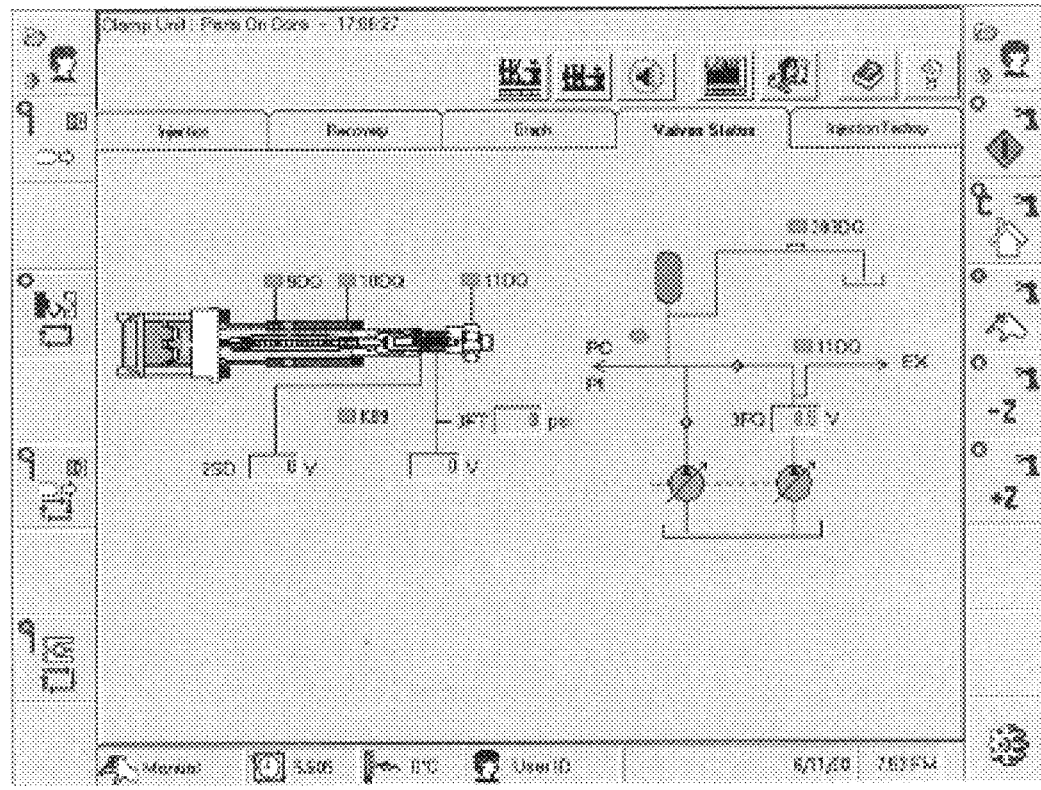
FIG. 16 is a view of a screen displaying the normal operation after the operator confirms the dialog box.
Figure 17:
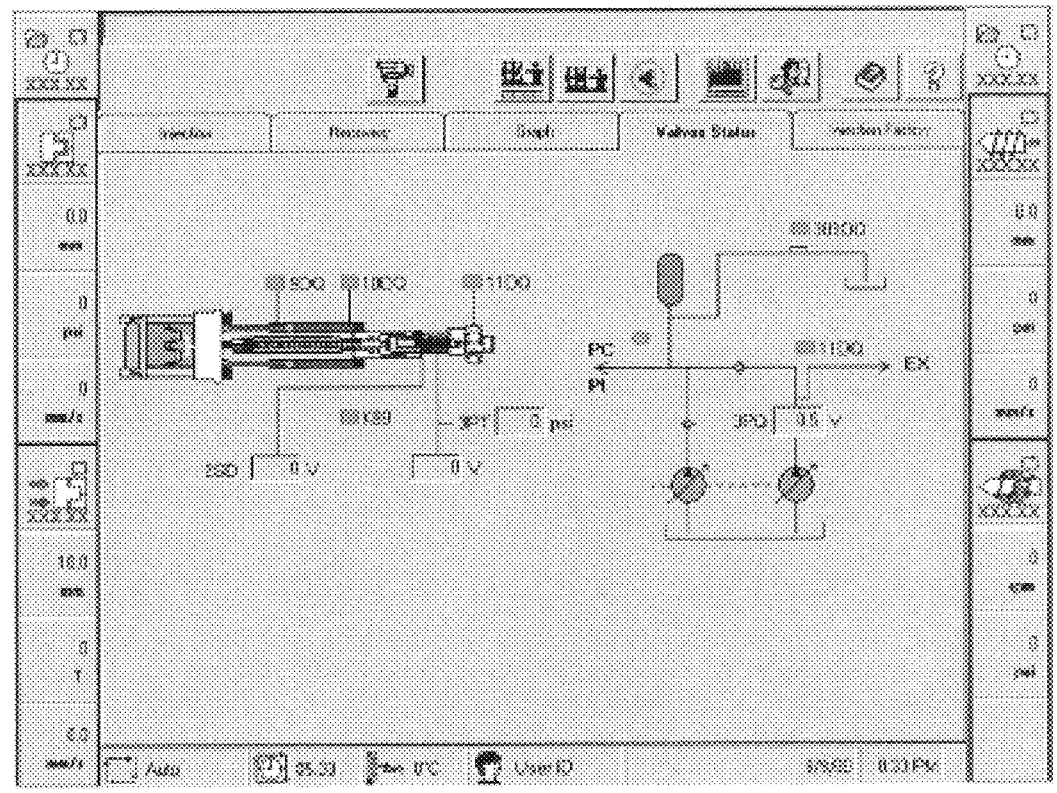
FIG. 17 is a view of a screen displaying the appearance of the sidebars showing the real time values of the process variables when the Process Variables group is selected.

A dialog box that allows saving the changed sidebar configuration is accessed by selecting the "Exit" icon. The dialog box allows the system user to save the changes, or to discard the changes. Once the dialog is completed, a normal operating screen replaces the "User Configuration" screen. See FIGS. 15 and 16.

The above method is further extended to include the assignment of multiple functions to a pushbutton for simultaneous operation of multiple control functions. For example, in order to achieve a blow off of parts from a multiple cavities mold, several air blow functions have to be operated either individually or simultaneously. This is a tedious task for the operator if the number of functions is high. By assigning a single activation pushbutton for a group of related air blow functions, which can be actuated at the same time, the task of the operator is greatly simplified. Those skilled in the art can easily appreciate the ease of extension based on the above disclosure, by adding a programming function on the icon selection screen that allows for multiple function assignment. An option is provided on the icon selection screen to allow the operator to select multiple functions. When this option is selected, a new group will appear on the screen. If not previously selected, all icons of this group are blank. The operator can select any icons from any groups and assign these icons to a group.

These grouped functions are activated by selecting this special group icon. The procedures for the selection and confirmation of accepting the new selection are performed similar to those described in the above.

The above method is further extended to include the assignment of sequential operation of a series of control functions by a single pushbutton. An option is provided on the icon selection window to allow the operator to program sequentially operated manual functions by one pushbutton. When this option is selected, a new group will appear on the window. The operator can then select the functions to be activated by selecting the icons from any group. When each icon is selected, a dialog window will appear. The operator is required to select-the option for stopping the icon represented function. The options include parameter entry for duration of operation, if the function is to be stopped by time; parameter entry for pressure set point, if the function is to be stopped by a pressure level; parameter entry for position set point, if the function is to be stopped by distance; selection of a event from the pre-defined events which are pre-programmed in the machine controller; or ending condition identical to the function when operated in automatic mode. The procedures for the selection and confirmation of accepting the new selection are performed similar to those described in the above. By completing the assignment of a series of the functions to this group, the operator will be able to control the desired sequence of operation by pressing a single pushbutton.

In addition to the above, a special group icon is available (not shown, but similar to the other group icons, modified as appropriate) to be selected for displaying the actual values of the process variables in real time. This function maximizes the use of the display's real estate when certain manual control functions are not in use, such as during automatic cycling of the system. Similar to the assignment of functions to pushbuttons, the process variables could be assigned from a list of available process variables provided by the machine controller.

A memory device is used to uniquely identify each operator and personalized settings. In a preferred embodiment, a portable I²C I/O EEPROM memory device, in the form of a key, as manufactured by Datakey, Inc. may be used. The housing of the HMI has a corresponding key-connection means for the key. By means of such connection, information can be stored and recalled by the machine controller. This device may be accessed by means of passwords, biometrics, or it can be the removable key noted above. The machine controller is capable of reading and writing to such a device. The device is used for customization purpose. It stores the information of the customized functions as described above and, but not limited to, the preferred language of text to be displayed on all screens, the operator's preferred engineering units of process variables, the operator's preferred organization of information on a screen, etc. It is pre-programmed with the operator's personal identity, which will be used by the machine controller to determine the access level of the operator to the system. All customization performed by the operator are stored, in the form of index files, into this device. Upon reading the information of the index files from this device, software of the machine controller will re-generate the customization. This will enable the operator to restore his/her own preferences such as language, engineering units and customized manual functions when he/she is operating the machine with the device.

4. Conclusion

Thus, what has been described is a human machine interface for an injection molding system which provides unlimited flexibility in configuring and operating the control system, provides a user-friendly method of configuring and controlling the molding machine, and provides a platform for future upgrades.

The individual components shown in the Drawings are all well-known in the molding machine control arts, and their specific construction an operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Molding machine control apparatus, comprising:
    a processor-controllable touch-sensitive display screen for displaying information at least in the form of icons representative of selectively operable machine functions;
    a plurality of application specific control function buttons disposed along one side of said touch-sensitive display screen;
    a plurality of basic control function buttons also disposed along a side of said touch-sensitive display screen; and
    a computer program product comprising software code portions configured to control machine operation and to control information display on the touch-sensitive display screen, the software code portions, in use, to cause:
        (i) movement of a component of the molding machine in response to an activation of at least one of said plurality of basic control function buttons;
        (ii) movement in a component of the molding machine in response to an activation of at least one of said application specific control function buttons; and
        (iii) changes in at least one of the icons in response to a touch of said touch-sensitive display screen.

2. Control apparatus according to claim 1, wherein said software code portions, in use, further cause movement in a plurality of components of the molding machine in response to an activation of at least one of said application specific control function buttons.

3. Control apparatus according to claim 2, wherein said software code portions, in use, further cause substantially simultaneous movement in the plurality of components of the molding machine in response to the activation of at least one of said application specific control function buttons.

4. Control apparatus according to claim 2, wherein said software code portions, in use, further cause substantially sequential movement in the plurality of components of the molding machine in response to the activation of at least one of said application specific control function buttons.

5. Control apparatus according to claim 1, wherein said software code portions, in use, further operate to prevent any movement of a molding machine component in response to a touch of said touch-sensitive display screen.

6. Control apparatus according to claim 1, wherein said touch-sensitive display screen includes a central portion and an edge portion, and wherein activation of at least one of said plurality of basic control function buttons causes a change in the touch sensitive display screen central portion, but not in said edge portion.

7. Control apparatus according to claim 6, wherein activation of at least one of said plurality of application specific control function buttons causes a change in the touch sensitive display screen edge portion.

8. Control apparatus according to claim 1, wherein activation of at least one of said plurality of application specific control function buttons causes a change in at least one icon.

9. Control apparatus according to claim 1, wherein said software code portions, in use, further cause storage of at least two different operator configurations, each such configuration corresponding to a different series of molding machine component movements, the control apparatus further comprising:

at least one data key which corresponds to one of the operator configurations; and a data key reader for reading said at least one data key.

10. Control apparatus according to claim 1, wherein:

said plurality of application specific control function buttons are disposed on two side edges of said display screen; said icons are displayed on side edges of said touch-sensitive display screen;

said plurality of basic control function buttons are disposed on a bottom edge of said touch-sensitive display screen; and molding machine activation icons are disposed in a central portion of said touch-sensitive display screen.

11. Control apparatus according to claim 1, wherein the software code portions, in use, further cause multiple machine functions to be assigned to an application specific control function button.

12. Control apparatus according to claim 1, wherein said software code portions further cause selected measured operation parameters to be associated with and displayed on an application specific control function button.

13. A molding machine display, comprising: a display screen having:

(i) a first screen area configured to display molding machine display indicia;

(ii) a second screen area configures to display molding machine function-actuating indicia;

(iii) a first plurality of buttons interactively coupled o said display screen and arranged to cause a charge in correspondingly assigned molding machine display indicia; and (iv) a second plurality of buttons interactively coupled to said display screen and arranged to initiate a motion in a molding machine component.

14. The molding machine display according to claim 13, wherein said first plurality of buttons is disposed on a top side and a bottom side of said display screen, and wherein said second plurality of buttons is disposed on a left side and a right side of said display screen.

15. The molding machine display according to claim 14, wherein said first plurality of buttons are further configured to change a corresponding molding machine function-actuating indicia.

16. The molding machine display according to claim 14 wherein said first plurality of buttons are further configured to control a motion in a molding machine component.

17. The molding machine display according to claim 14, wherein said display screen comprises a touch screen device, and wherein molding machine component motions cannot be actuated through said touch screen device.

18. The molding machine display according to claim 17, wherein said touch screen device is configured to change corresponding molding machine display indicia.

19. The molding machine display according to claim 14, wherein, upon actuation, at least one of said first plurality of buttons is configured to cause a plurality of molding machine component motions in sequence.

20. The molding machine display according to claim 14, wherein, upon actuation, at least one of said first plurality of buttons is configured to cause a plurality of molding machine component motions in parallel.

21. The molding machine display according to claim 14, wherein each of said second plurality of buttons is configurable to cause at least two different functions.

22. The molding machine display according to claim 14, wherein said first plurality of buttons is disposed at a different location to said second plurality of buttons.

23. A human machine interface of a molding machine, the human machine interface comprising:

a touch screen display for displaying machine status icons and machine activation icons;

a plurality of programmable buttons disposed along a side of said touch screen display and configured to change said machine status icons;

a plurality of non-programmable buttons disposed along another side of said touch screen display and configured to control a motion of a part of the molding machine in response to actuation thereof; and at least one of said plurality of programmable buttons being programmable to initiate control of a plurality of molding machine movements in response to actuation thereof.

24. The human machine interface according to claim 23, wherein the at least one of said plurality of programmable buttons is programmable to initiate control of a sequential plurality of molding machine movements in response to actuation thereof.

25. The human machine interface according to claim 23, wherein the at least one of said plurality of programmable buttons is programmable to initiate control of a substantially simultaneous plurality of molding machine movements in response to actuation thereof.

26. A human machine interface comprising:

a display screen for displaying a plurality of machine function icons which correspond to a plurality of molding machine movements, said display screen also displaying a plurality of configuration icons;

a plurality of buttons disposed along a side of said display screen, at least one of said buttons corresponding to one of the plurality of configuration icons and being actuable to configure the plurality of machine function icons into (i) a first configuration and (ii) a second configuration different from the first sequence; and a memory device reader couplable to a processor of the human machine interface, the memory device reader for at least reading, in use, configuration command data from at least one portable memory device containing such configuration commands arranged to cause the display screen to display one of the first configuration and the second configuration.

* * * * *

UNITED STATES PATENT AND TRADEMARK OFFICE
CERTIFICATE OF CORRECTION

PATENT NO. : 6,684,264 B1
DATED : January 27, 2004
INVENTOR(S) : Christopher Wai-Ming Choi It is certified that error appears in the above-identified patent and that said Letters Patent is hereby corrected as shown below:

Column 2,
Line 40, "is a enlarged" should read -- is an enlarged --.
Line 52, "icons, appeared after" should read -- icons, appearing after --.

Column 4,
Line 55, "will interleave processing of machine" should read -- will interleave-process the machine --.

Column 5,
Lines 22 and 23, "simultaneously.control" should read -- simultaneously control --.
Line 50, "o bviate" should read -- obviate --.

Column 10,
Line 5, "on the both" should read -- on both --.
Line 16, "the. sidebar" should read -- the sidebar --.

Column 13,
Line 39, "configures" should read -- configured --.
Line 41, "coupled o said" should read -- coupled to said --.
Line 42, "a charge in" should read -- a change in --.

Signed and Sealed this

Fifth Day of July, 2005

JON W. DUDAS
*Director of the United States Patent and Trademark Office*